United States Patent Office 3,625,664
Patented Dec. 7, 1971

3,625,664
PROCESS FOR THE PRODUCTION OF RICH FUEL TO REPLACE NATURAL GAS BY MEANS OF CATALYTIC HYDROGASIFICATION UNDER PRESSURE OF FLUID HYDROCARBONS
Carlo Padovani, Via Ampere 15, Milan, Italy
Filed Apr. 4, 1968, Ser. No. 718,860
Claims priority, application Italy, Apr. 5, 1967, 14,605/67, Patent 791,843
Int. Cl. C07c 9/04; C10g 13/02
U.S. Cl. 48—197   11 Claims

ABSTRACT OF THE DISCLOSURE

A mixture of methane and hydrogen which is interchangeable with natural gas, is obtained from liquid hydrocarbons by means of a two step catalytic hydrogenation process under pressure. In the first step a complete gasification, but not a complete hydrogenation, is effected by contacting the liquid hydrocarbons with a mild-hydrogenating catalyst in such a controlled condition of temperature, pressure, hydrogen-to-carbon ratio as to obtain a gas containing 10–60% by volume of free hydrogen. In the second step the gas obtained in the first step is practically completely hydrogenated to methane on a catalyst having high hydrogenating and methanating activity. The resultant product is essentially methane with up to 12 volume percent hydrogen.

---

Figure 1:
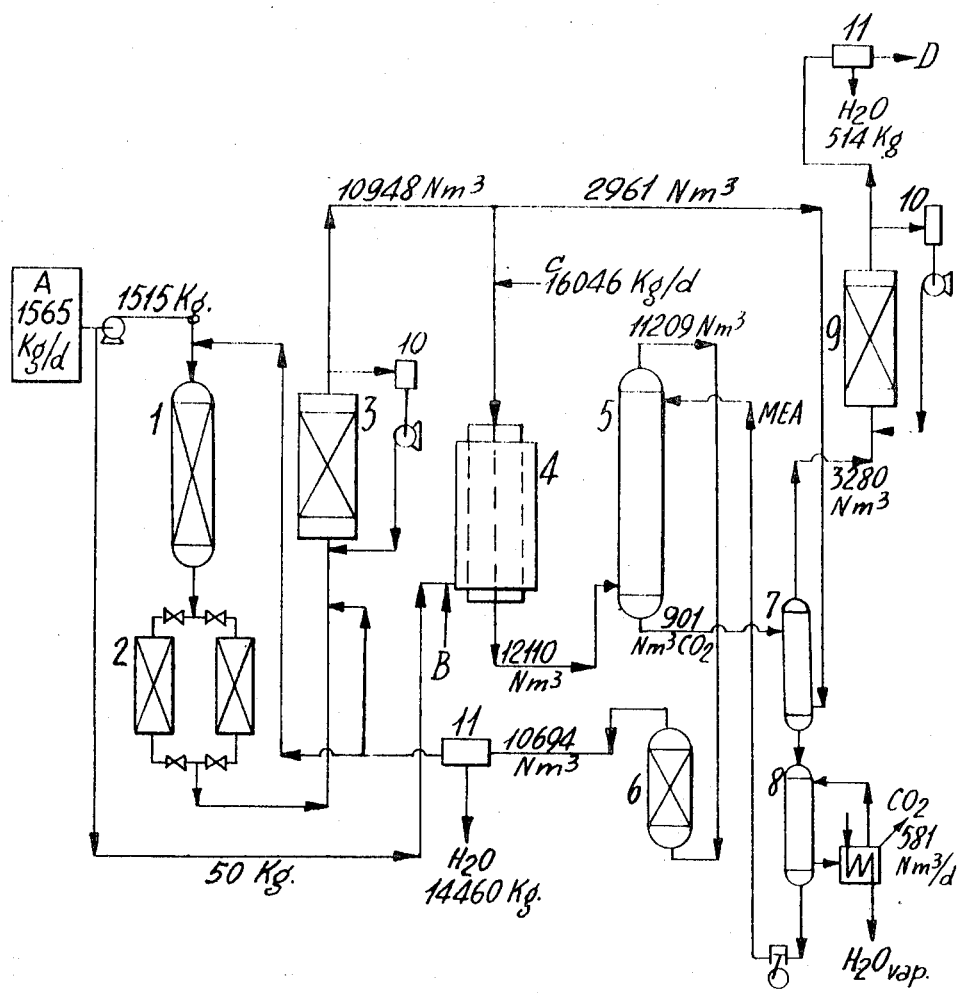

In a former copending Italian patent application, No. 14,484 of Apr. 3, 1967, new Italian Pat. No. 791,829 issued Nov. 15, 1967 a process was described that makes it possible to gasify almost completely, while reducing to a minimum the formation of liquid or solid by-products, hydrocarbons or petroleum derivatives the characteristics of which vary within a wide range, from light distillates to residues and crudes, so as to produce fuel gas of widely varying characteristics. The process is essentially based on the following characteristics:

(a) The use of an average activity hydrogenating catalyst that can easily be regenerated, (b) The use of an excess of hydrogen over the stoichiometric amount, this excess being higher than the C/H ratio in the hydrocarbon or mixture of hydrocarbons to be gasified and lower than the partial pressure of hydrogen during hydrogenation;

(c) The use of charges of hydrocarbons or petroleum derivatives having a sulphur content, by weight, not exceeding 0.5%, an asphaltene content, not exceeding 1.5% and a mineral substance content not exceeding 100 p.p.m. The hydrogasification treatment is preceded by sulfur removal, asphalt removal and ash content reduction when the sulphur, asphalt or ash content in the charge exceeds the above limits.

(d) Special technological processes for the production of hydrogenating gas using the same charge to be hydrogasified, or part, of the gas produced by hydrogasification of the charge, or the residues rich in asphaltenes or in ash, which are separated from the original charge by deasphaltation or distillation and excluded from the hydrogasification; these technological processes permitting a practically complete gasification of even crude oils;

(e) Special technological processes for the preparation of the hydrogasification catalyst.

By using the operating conditions and the methods described in the specification of the above patent, it is possible to obtain complete gasification of petroleum derivates with great flexibility with respect both to the characteristics of the raw materials and the properties of the gas produced.

However, as was pointed out in the description and examples of said patent, to avoid a large formation of solid and liquid by-products and in particular to reduce to a minimum carbon deposits on the catalyst causing its inactivation, is necessary to use a considerable excess of hydrogen over the stoichiometric proportion theoretically required for complete conversion of the charge to methane, the excess required being as higher as it is the weight ratio between carbon and hydrogen in the charge treated and as lower it is the partial pressure of hydrogen (which is the product of the volumetric concentration of hydrogen in the hydrogenating gas by the total pressure) in the hydrogenating gas used.

Furthermore, by prolonging the passage of the charge mixed with hydrogenating gas over the catalyst, the percentage of gaseous hydrocarbons having a molecular weight higher than methane in the gas produced is increased.

Therefore, if one does not wish to use too high a pressure and does not wish to make too frequent regenerations, it is advisable to carry out the hydrogasification in such a way as to produce gas containing sufficiently high contents of hydrogen and gaseous paraffins higher than methane in addition to the methane.

On the other hand an excessively high content of hydrogen and/or high paraffin hydrocarbons may represent a disadvantage when the gas produced is intended to be used as a substitute for natural gas consisting essentially of methane.

One purpose of this invention is to permit the production of gas fuels mainly composed of methane, which can be used as a substitute for natural gas, without using very high pressures and without frequent regeneration of the catalyst.

Another purpose of this invention is to permit the maximum utilisation of the carbon, hydrogen and heat value contained in the charge.

Another purpose of this invention is to produce a gas mainly composed of methane, which gas is interchangeable with natural gas, starting with liquid hydrocarbons (even containing relatively heavy fractions), without resorting to onerous operating conditions such as high pressures and frequent regenerations of the catalysts employed.

It has now been found that the paraffin hydrocarbons higher than methane may be practically eliminated from the final gas produced and that the hydrogen content may be reduced to low values, for instance below 10%, by dividing hydrogasification into two operating steps by means of different catalysts and in different operating conditions. Specifically, in the first step average activity hydrogenating catalysts that can easily be regenerated (that is catalysts which are active at temperatures above 550° C. and at pressures above 15 atmospheres hereinafter sometimes described as ata.) are used; these catalysts consist of a carrier with a base of refractory materials (alumina and/or magnesia), possibly added or combined with silica or calcium oxide on which are spread active elements such as Mo, W, Cr, Ni, Co, Fe and their oxides, sulphides or other salts. These catalysts can easily be regenerated by known fluid and mobile bed techniques and by means of the expedients described in the above-mentioned patent application No. 14,484. Furthermore in this first step a considerable excess of hydrogen is used, regulating the operating conditions in such a way as to achieve complete gasification without completing the hydrogenation, that is, leaving in the produced gas, besides methane, considerable quantities (more than 10% and up to 60% in volume) of free hydrogen and gaseous hydrocarbons with an atomic ratio $$\frac{H}{C} < 4$$

(above 2% in volume calculated as ethane); while in the second step the gas produced in the first step is conducted through one or more reactors, containing high-activity hydrogenating catalysts on which hydrogenation in the gaseous phase is completed thereby obtaining a gas mainly composed of methane, having small percentages, generally not higher than 12%, of free hydrogen.

By the definition "high-activity hydrogenating catalysts," we mean catalysts able to effect complete hydrogenation to methane of the carbon present in the gaseous phase at sufficiently low temperatures (i.e. below 500° C.) so that the equilibria of the following type:

$$2CH_4 \rightleftharpoons C_2H_6 + H_2 \quad \text{(Equation 1)}$$

may be completely shifted to the left.

These high-catalytic activity catalysts used in the second step (hydrogenation) are not generally as easily regenerable by controlled oxidation as those used in the first step; but this is not important because the hydrogenation of previously desulphurized gaseous hydrocarbons at relatively low temperatures as done in this second step of hydrogenation, does not cause a large formation of carbon or liquid deposits.

For the same reason it is not necessary to maintain a high ratio between the used hydrogen and the stoichiometric hydrogen (excess of hydrogen), in order to be able to obtain gas with low contents of free hydrogen.

As high catalytic activity catalysts for the second step of hydrogasification, one can use catalysts with alumina and/or magnesia base, possibly combined with silicon oxides and/or calcium oxide, which serves as a support for the dispersed metals having a strong hydrogenating activity. Examples of such metals are nickel, ruthenium, iron, cobalt, palladium, platinum.

The preparation of the aforesaid catalysts may be done by means of the usual technological processes such as hot formation of the supports and subsequent impregnation with salts or active metals or coprecipitation or cold-blending, followed by agglomeration at high and low temperature with the addition of alloying agents, or formation by pressing, extrusion or spheroidization or other known technological processes.

As mentioned above, the temperature used during the second step of hydrogenation is lower than the temperature used in the first step; it generally ranges between 180° C. and 450° C., but in any case is lower than 500° C.

The pressure may be the same or lower than that used in the first step, but in any case no lower than 5 ata.

Under these conditions the gaseous hydrocarbons with more than one carbon atom contained in the gas, are hydrogenated to methane almost completely by the free hydrogen contained in the same gas, that is, without adding other hydrogen (auto-hydrogenation).

The reactions that take place during auto-hydrogenation may be represented by the following:

$$C_nH_m + \frac{4n-m}{2} H_2 \rightarrow nCH_4 \quad \text{(Equation 2)}$$

It may happen however, that the auto-hydrogenation of the gaseous paraffinic hydrocarbons present in the hydrogasification gas is not sufficient to reduce the content of free hydrogen in the final gas within the desired limits ($\leq 12\%$); in this case, according to the process proposed in this invention, other light hydrocarbons, preferably gaseous paraffin hydrocarbons, and in any case, hydrocarbons where the weight $C/H$ ratio is $\leq 5.25$ are added to the gas coming from the first step of hydrogenation before it on to the second step.

The hydrocarbons added between the first and second steps may derive from the same charge used in the first step, from which they were obtained by a preliminary fractionation.

Light charges coming from separate sources may be used alternately.

As a source of hydrogen for the various operations of hydrogenation which take place during the process, as mentioned above, one of the different processes described in the patent application 14,484 may be used by which processes the hydrogen is taken from portions of the charge material or of gas produced or from asphaltene residues adapting the method chosen for obtaining same to the requirements of the process in accordance with this invention. Thus, for instance, a portion of the methane rich gas produced in the first step of hydrogasification may be deviated from the main process and charged together with steam, over the nickel oxygenolysis catalyst. This nickel catalyst is one which is able to promote the reactions of oxidative reforming or oxygenolysis between steam and the hydrocarbons under pressures, equal to or lower than those used in hydrogasification at 620–850° C. A mixture of oxides of carbon, methane, steam and hydrogen is passed over catalysts that promote the reaction between CO and steam to $CO_2$ and hydrogen. The gases are then conveyed to the $CO_2$ absorption unit and eventually to methanators, where the last traces of CO and $CO_2$ are eliminated to a maximum limit of 1% for each of these components by the use of the same hydrogen contained in the gas. Finally, the hydrogen rich gas thus obtained, with optional compression, is sent as hydrogenating gas to the various vessels in the process requiring same.

In the same way we can obtain hydrogenating gas starting from the hydrocarbons obtained during the process itself by carrying out a gasification under pressure with oxygen and steam, followed by desulphuration and reduction of the oxides of carbon obtained with known technological processes; or else by oxidizing the hydrocarbons under pressure with air and steam so as to obtain mixtures of CO, $CO_2$ and nitrogen and by sending these mixtures alternately with steam over metal oxides, in particular, iron oxide, that become alternately and subsequently reduced and oxidized, while nearly pure hydrogen is obtained. In this second case the operation can be carried out continuously with a mobile or fluid bed and the energy of the gases produced by the reduction of the iron oxides under pressure recovered by means of expansion in a turbine, using it to compress the air that is used for the incomplete oxidation of the hydrocarbons.

In accordance with a preferred alternative of this invention, the charge of liquid hydrocarbons to be hydrogasified, after purification (reduction of the sulphur and asphaltene content and/or mineral components to below the limits and in accordance with the technological processes described and claimed in the above-mentioned Italian Pat. No. 791,829), undergoes fractionation by distillation at atmospheric pressures or at higher pressures thus obtaining a bottom, a middle and a top fraction generally composed of hydrocarbons with a number of carbon atoms ($n$) equal to or less than 6 in the conventional molecule $C_nH_m$. The residue is used as fuel in thermal operations of hydrogasification and as a raw material for the production of hydrogen (in accordance with the technological process described and claimed in the above-mentioned patent application No. 14,484). The middle fraction is used as a charge for the first step of the hydrogasification and eventually for the production of hydrogen, and the top fraction is added to the gas produced in the first step of hydrogasification and conveyed with that gas to the second hydrogasification step as described above.

According to another alternative of this invention, in order to reduce to the desired values the content of free hydrogen in the gas leaving the hydrogasification reactor of the first step, carbon monoxide and/or carbon dioxide are added to the gases. These oxides of carbon react with the hydrogen as follows:

$$CO + 3H_2 = CH_4 + H_2O \quad \text{(Equation 3)}$$

$$CO_2 + 4H_2 = CH_4 + 2H_2O \quad \text{(Equation 4)}$$

The catalysts used for hydrogenation of the carbon oxides may be the same high activity hydrogenating catalysts used in the second step for the complete hydrogenation of the light hydrocarbons, or even catalysts more specifically indicated for carrying out reactions represented by Equations 3 and 4 (methanization).

The second step of hydrogasification may be carried out in two reactors in series: in the first reactor there are catalysts and operating conditions suitable for the promotion of hydrogenation of the hydrocarbons as in Equation 2. In the second reactor however catalysts and operating conditions specifically suitable for developing hydrogenation of the carbon oxides are used in order to promote the reactions represented by Equations 3 and 4. In this case the reduction in content of excess hydrogen contained in the gas produced in the first step is obtained by hydrogenating to methane the gaseous hydrocarbons present in the gas itself plus the light hydrocarbons added plus the carbon oxides added between the first and second steps.

The carbon monoxide and carbon dioxide added to the hydrogasification gas and sent with this gas to the second step of hydrogenation may be of external origin or may be derived indirectly from the same charge used for hydrogasification. The oxides of carbon may be obtained by means of combustion and, oxidative reforming (oxygenolysis) operations connected with the same process. They can be isolated from the gases containing them and successively recycled for hydrogenation by means such as adsorption and desorption with solid or liquid adsorbents.

In accordance with one particular alternative of this invention the oxides of carbon which appear in gaseous currents under pressure produced in the process described and claimed in the cited patent application No. 14,484 are eliminated by the above-mentioned gaseous currents by washing under pressure with adsorbent liquids.

Adsorption may take place with copper ammonium solution; with water; ammonium or alkaline solutions; ethanolamine or other liquid adsorbents having an affinity for carbon dioxide.

Usually the liquid adsorbent is then regenerated, desorbing the carbon monoxide and carbon dioxide by heating and decompression in single step. In accordance with the above-mentioned alternative of this invention, the desorption operation of oxides of carbon from the adsorbent liquid occurs in two steps. In the first step partial desorption is effected as the liquid undergoes heating and stripping under pressure with the same gas coming from the first step of hydrogasification, the gaseous mixture thus obtained, being conveyed after drying over the methanization catalyst. The operating conditions (temperature, pressure and the gaseous flow to liquid flow ratio), during the above-described partial desorption being regulated so that the ratio between CO or $CO_2$ desorbed and $H_2$ in the stripping gas is that required for methanization so as to leave in the final gas no more than 10–12% of free hydrogen. The liquid leaving the partial desorption under pressure is freed from carbon dioxide residue by conventional methods (depressurization and heating) and then returned to the cycle for adsorption.

The hydrogasification reactions (hydrogenation of light hydrocarbons and/or carbon oxide) that take place in the second step of the process in this invention are on the whole highly exothermic, being able to develop about 1700 Kcal. per cubic meter of methane produced. It was found that by pre-heating the reagents (hydrocarbons and hydrogenating gas, for instance) to temperatures ranging from 300° to 500° C., the operations of hydrogasification of reactor or reactors of the second step may be autothermic.

In order to avoid localized overheating in the catalytic bed, appropriate means for temperature regulation may be used, such as recirculation of the gases produced, suitably cooled, or subdivision of the hydrogenation operation and/or introduction of hydrogenating gas in several steps, with eventual heating and/or cooling between the steps and/or immersion of cooling bodies in the catalytic beds. The cooling bodies may be coils wherein water or steam or other cooled fluids circulate or tubes wherein endothermic transformation take place such as oxidative reforming (oxygenolysis) with hydrocarbon vapors or evaporation of water and other liquids.

To facilitate temperature control and thermal exchanges a fluid bed catalyst may be used.

Having thus described the nature and chacateristics of this invention, we shall now give some examples of application of the same, it being understood that the given examples and purposes do not in any way limit the application of the invention described in this patent application.

EXAMPLE 1

This example concerns the flow diagram shown in FIG. 1 (in which 1—hydrodesulphurizer, 2—purifying masses, 3—1st hydrogasifier, 4—tubular reformer, 5—$CO_2$-absorption, 6—methanation, 7—partial $CO_2$-stripping, 8—complete $CO_2$-stripping, 9—2nd hydrogasifier, 10—cooler, 11—condensers, in addition: A=gasoline; B=air; C=steam; D=gas produced). The treated gasoline (A) has the following characteristics:

Distillation

Starting point 73° C.—$d$ 15°/4° C.=0.69

50% vol. <94° C.—C/H=5.38

Final point 116° C.—$S$=300 p.p.m.

The gasoline vapor is mixed with hydrogenating gas and sent over a Co-Ni-Mo catalyst in reactor 1, where hydrodesulphuration takes place at 25 ata. and at 380° C. and then in reactors 2 containing a mass with a base of iron and zinc oxide where $H_2S$ and the more resistant sulphur compounds are sorbed. After desulphuration, the sulphur content of the gasoline is ≤100 p.p.m.

The disulphurized gasoline vapors together with the excess hydrogenating gas are mixed with another hydrogenating gas and sent to reactor 3 where, at temperatures ranging from 620° C. to 780° C., the complete hydrogasification of the charge takes place. The exit gas is composed of hydrogen (57.6%) methane (36.05%) ethane (5.10%), propane (1.25%) and is divided into three streams. One stream is recirculated in the reactor 3 through a cooler 10 to control the temperature, another stream (about one third) is sent on to the second step of hydrogenation, while a third stream, mixed with steam, is sent on to the reformer 4 (endothermic oxygenolysis). The reformer 4 contains a nickel catalyst and is adapted to produce hydrogenating gas.

The operating conditions in the reformer 4, that is, temperature, pressure and the $H_2O$ to hydrocarbon ratio, are selected so as to obtain an end gas containing only 1.42% CO and 7.44% $CO_2$. After absorption of $CO_2$ in monoethanolamine, hereinafter sometimes termed "MEA" (always under pressure of 25 ata.) in unit 5, and successive methanization in reactor 6, a gas essentially composed of hydrogen (70–72%) and methane (28–30%) to be used for hydrogasification (1st step) is obtained.

The desorption of $CO_2$ with related regeneration of ethanolamine is done in two stages.

In the first stage (unit 7), in which only a part of the $CO_2$ absorbed is released, the $CO_2$ saturated ethanolamine, always under pressure of 25 ata., is heated to 100–105° C. The $CO_2$ is stripped from the ethanolamine and leaves the unit 7 with the gas coming from the hydrogasifier 1. The operating conditions are regulated in such a way that the monoethanolamine releases a quantity of $CO_2$ necessary and sufficient to transform into methane 60–70% of the hydrogen present in the gas coming from the first step of hydrogasification in unit 1.

The mixture of this gas with $CO_2$ leaving the desorber 7, is conveyed to the hydrogasifier for the second step (unit 9 in the drawing) where the following reaction takes place:

$$CO_2 + 4H_2 \rightarrow CH_4 + 2H_2O$$

together with reactions of the type:

$$C_nH_m + \frac{4n-m}{2} H_2 \rightarrow nCH_4$$

One portion of the gas leaving the reactor 9 is recirculated in the reactor 9 after cooling in order to regulate the temperature.

The working conditions and the rates of flow are described in FIG. 1 and in Table 1, below. The pressure in the partial desorber 7 is practically the same used in the whole cycle (25 ata.). The temperature is 50–60° C. 2000 Nm.$^3$ of gas composed of about 90% $CH_4$ and 10% hydrogen for every 1565 kg. of gasoline is obtained.

EXAMPLE 2

Figure 2:
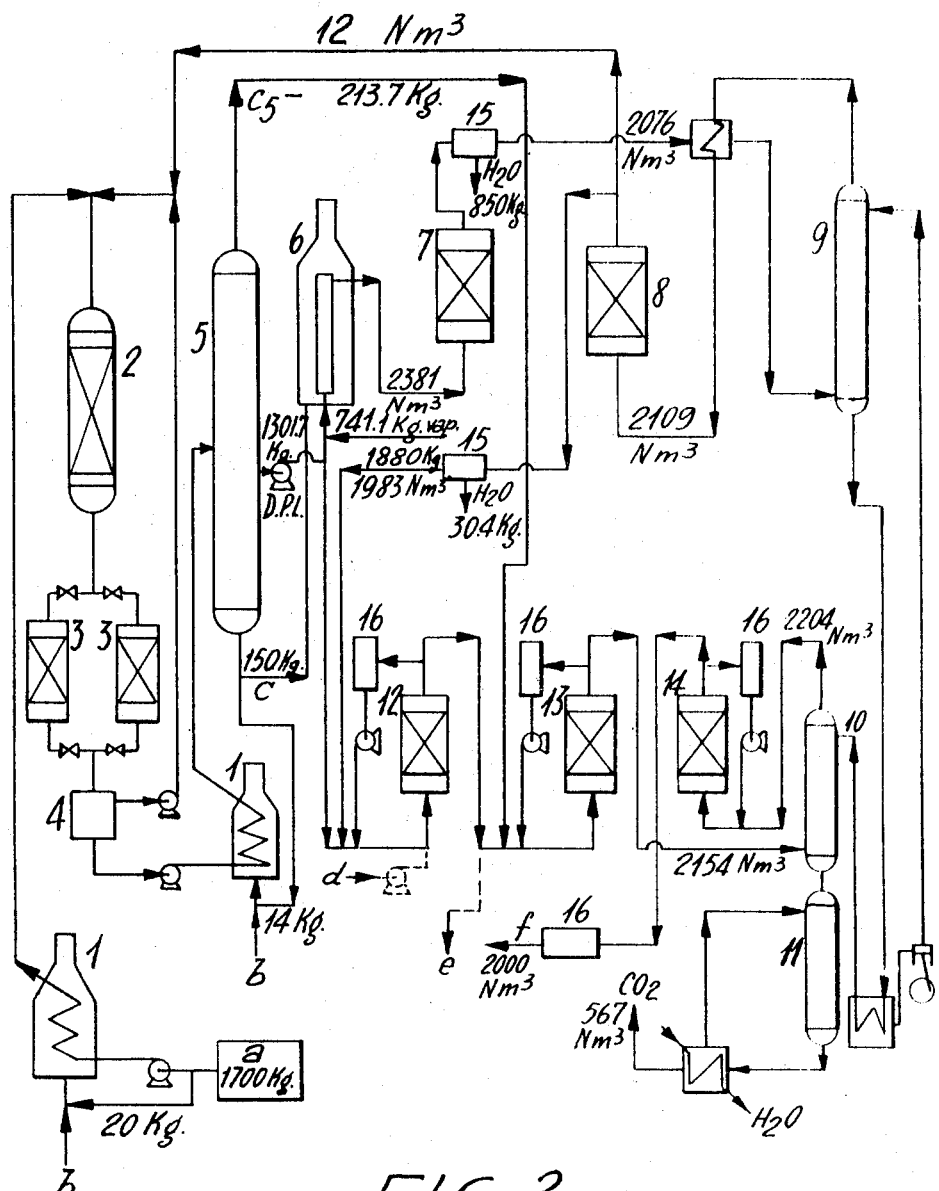

The cycle used, the operating conditions and the results pertaining to this example are given in the drawing of FIG. 2 and in Table 2.

The gasoline used has the following characteristics: Distillation—starting point=41° C.; final point=135° C.; 50% vol. <96° C. S=450 p.p.m., C/H=5.38 d 15°/4° C.=0.687

The main differences with respect to Example 1 are the following:

In FIG. 2 the following numerals are used to represent the following unit processes: 1—ovens; 2—hydrodesulphurizer; 3—purifying masses; 4—separator; 5—stripping column; 6—reforming device; 7—CO conversion; 8—methanizer; 9—decarbonization; 10—$CO_2$ stripping (1st step); 11—$CO_2$ stripping (second step); 12—1st hydrogasifier; 13—2nd hydrogasifier; 14—3rd hydrogasifier; 15—condensers; 16—coolers; furthermore $a=$gasoline; $b=$air; $c=$residue; $d=$steam+air; $e=H_2O+$gas; $f=$gas produced.

After desulphuration the gasoline is condensed and separated from the recycled hydrogenating gas and then re-evaporated in the stripping column 5 where it is separated into a top fraction ($C_5$—) an intermediate fraction and a bottom fraction.

The intermediate fraction coming from the stripping column, comprising about 75% of the charge, is sent partially to the reforming unit 6 under pressure and partially (about 42%) to the first step hydrogasification (unit 12). In this case, that is, the hydrogen is produced by directly reforming a portion of the gasoline rather than the recycled gas. The bottom fraction coming from the stripping column 5 is used as fuel in the evaporation oven 1 and in the reforming device 6. The top fraction ($C_5$—) is sent to the second step of hydrogasification. The oxides of carbon contained in the gas produced by reforming of gasoline in 6 undergoes conversion by steam in reactor 7, then washing of $CO_2$ in the MEA washer 9 (always operating at 25 ata.); then methanization in the reactor 8. The hydrogenating gas thus obtained, composed of 72.4% $H_2$ and 27.6% $CH_4$ is used for hydrodesulphuration and hydrogasification of the first step.

The gas coming from the first hydrogasifier 12 is conveyed to the first hydrogenater 13 of the second step, after addition of the $C_5$ fraction coming from the stripping column; it is then used as stripping gas in the first desorber (10) kept at 25 ata., and at 50–60° C., where it is charged with the quantity of $CO_2$ required to transform to methane the remaining hydrogen (so as to leave a maximum of 12% of free hydrogen by volume in the final gas, after methanization); it then passes to the second hydrogasification reactor of the second step (unit 14).

The MEA, which was partially freed of $CO_2$ in the partial desorber 10, is completely regenerated by heating and depressurization in unit 11 and then recirculated to absorber 9.

The operating conditions, the rates of flow of the fuel gas and the compositions of the gases are shown in the diagram in FIG. 2 and in Table 2.

2000 Nm.$^3$ of a gas composed of about 90% by volume methane and about 10% by volume hydrogen are obtained from about 1700 kg. of gasoline. Units 13 and 14 may be combined in a single reactor. To treat less volatile gasoline distillates, it is sufficient to raise the pressure in reactor 12 and/or carry out more frequent regeneration and/or use a hydrogenating gas that is richer in hydrogen.

TABLE 1

| | 1 | 2 | 3 | 4 | 6 | 9 |
|---|---|---|---|---|---|---|
| | Hydrodesulphurization unit | Purifying masses | 1st step hydrogasification | Continuous endothermic reforming | Methanization | 2nd step hydrogasification |
| Pressure, ata | 25 | 25 | 25 | 25 | 25 | 25 |
| Temperature, °C | 380 | 250–350 | 620–750 | 630 | 350 | 380–420 |
| Catalyst used | | Co-Mo-Ni on alumina | Zinc and iron oxides | MSC/h1 | MSC/ra | MSC/ma | MSC/h2 |
| Gasoline consumption, kg | | | 1,515 | 50 (oven) | | |
| Steam added, kg | | | | 16,046 | | |
| Steam consumed, kg | | | | | 1,586 | |
| Quantity hydrogenating gas added Nm.$^3$ | 110 | | 10,584 | | | 2,961 |
| Gas volume produced | | | 10,948 | 12,110 | 10,694 | 2,000 |
| Composition of gas produced: | | | | | | |
| $H_2$ | | | 57.60 | 67.02 | 71.08 | 10.2 |
| $CH_4$ | | | 36.05 | 24.12 | 28.92 | 89.8 |
| CO | | | | 1.42 | ≤10 p.p.m | |
| $CO_2$ | | | | 7.44 | ≤10 p.p.m | |
| $C_2H_6$ | | | 5.10 | | | |
| $C_3H_8$ | | | 1.25 | | | |

NOTE: dr=0.50; Pci=7,960 Kcal/Nm.$^3$; w=11,200 Kcal/Nm.$^3$.

TABLE II

| | 2 | 3 | 6 | 7 | 8 | 12 | 13 | 14 |
|---|---|---|---|---|---|---|---|---|
| | Hydrodesulphurizer | Absorbent masses | Reforming device | Reforming CO | Methanator | 1st step hydrogasifier | 2nd step hydrogasifier | 3rd step hydrogasifier |
| Pressure, ata | 25 | 25 | 25 | 25 | 25 | 25 | 25 | 25 |
| Temperature, °C | 380 | 250-350 | 720 | 280-420 | 350 | 620-750 | 380-420 | 360-400 |
| Catalyst | Co-Mo-Ni on alumina | Zinc or iron oxides | MSC/ra | Fe or Zn-Cr-Cu oxides | MSC/ma | MSC/h1 | MSC/h2 | MSC/h2 |
| Gasoline consumption, kg | | | 741.1 | | | 560 | 213.7($C_5-$) | |
| Steam added, kg | | | 1,880 | 1,128.2 | | | | |
| Steam consumed, kg | | | 746.5 | 278.2 | | | | |
| Volume of hydrogenating gas added, Nm.³ | 12 | | | | | 1,983 | 2,083 | 2,154 |
| Volume of gas produced Nm.³ | | | 2,381 | 2,726 | 1,995 | 2,083 | 2,154 | 2,000 |
| Composition of gas produced, percent: | | | | | | | | |
| $H_2$ | | | 50.84 | 57.21 | 72.4 | 49.2 | 31.3 | 9.4 |
| $CH_4$ | | | 21.52 | 18.77 | 27.6 | 37.5 | 68.7 | 90.6 |
| $CO$ | | | 16.20 | 1.40 | ≤10 p.p.m. | | | |
| $CO_2$ | | | 11.44 | 22.72 | ≤10 p.p.m. | | | |
| $C_2H_6$ | | | | | | | 9.3 | |
| $C_3H_8$ | | | | | | | 3.4 | |
| $C_4H_{10}$ | | | | | | | 0.6 | |

NOTE: dr=0.51; Pci=8,000 Kc/Nm.³; W=11,200.

What is claimed is:

1. A process for producing a combustible gas consisting essentially of methane and up to 12% by volume of hydrogen gas based upon the combined volume of the methane and the hydrogen gas, said process comprising the steps of:
   (I) contacting in a first hydrogenation zone at temperatures above 550° C.:
      (a) liquid hydrocarbons
      (b) hydrogen gas in an amount greater than that necessary to convert all the hydrocarbons to methane,
      (c) a hydrogenating catalyst selected from the group consisting of molybdenum, tungsten, and chromium
   to produce an effluent from the first hydrogenation zone containing from 10 to 60 volume percent hydrogen gas based upon the total volume of effluent gas;
   (II) charging the effluent from the first hydrogenation zone to a second hydrogenation zone in contact with a catalyst selected from the group consisting of nickel, ruthenium, cobalt, platinum, and palladium at a temperature below 500° C., to produce an effluent consisting essentially of methane and up to 12 volume percent of hydrogen gas based upon the combined volume of the methane and the hydrogen gas.

2. A process for producing a combustible gas consisting essentially of methane and up to 12% by volume of hydrogen gas based upon the combined volume of the methane and the hydrogen gas, said process comprising in sequence the steps of:
   (I) contacting in a first hydrogenation zone at temperatures above 550° C. and pressures above 15 atmospheres:
      (a) hydrocarbons having a sulphur content equal to or less than 0.5%, having an asphaltene content equal to or less than 1.5% and having an ash content equal to or less than 100 p.p.m.,
      (b) hydrogen gas in an amount greater than that necessary to convert all the hydrocarbons to methane,
      (c) a hydrogenating catalyst selected from the group consisting of molybdenum, tungsten, and chromium
   to produce an effluent from the first hydrogenation zone containing from 10 to 60 volume percent hydrogen gas based upon the total volume of effluent gas;
   (II) charging the effluent from the first hydrogenation zone to the second hydrogenation zone in contact with a catalyst selected from the group consisting of nickel, ruthenium, cobalt, platinum, and palladium at a temperature below 500° C. to produce an effluent consisting essentially of methane and up to 12 volume percent of hydrogen gas based upon the combined volume of the methane and the hydrogen gas.

3. A process of claim 1 wherein oxides of carbon are charged to said second hydrogenation zone in an amount sufficient to convert the oxides of carbon and a portion of the hydrogen gas to methane and water leaving hydrogen gas in the second hydrogenation zone effluent in an amount up to 12% by volume based on the combined volume of methane and hydrogen gas.

4. A process of claim 1 further comprising the steps of
   (III) contacting a portion of the effluent from the first hydrogenation zone in a reaction zone with steam, oxygen, and a nickel catalyst at temperatures of 620 to 850° C. in order to produce a gas consisting essentially of oxides of carbon, methane, and hydrogen;
   (IV) removing a major portion of the oxides of carbon,
   (V) methanizing the residual traces of the oxides of carbon, and then
   (VI) charging this gas to the first hydrogenation zone.

5. A process of claim 1 wherein the hydrocarbons are gasoline.

6. A process of claim 5 wherein the gasoline is fractionally distilled to produce a top fraction, an intermediate fraction and a bottom fraction;
   wherein the bottom fraction is employed as fuel in the process,
   wherein the intermediate fraction is employed to produce hydrogen which is employed as the hydrogenation gas, and
   wherein the top fraction is charged to the second hydrogenation zone of the process.

7. A process of claim 3 wherein the gases containing oxides of carbon are contacted with a liquid absorbent, and wherein the oxides of carbon are partially desorbed from the liquid absorbent by stripping with effluent from said first hydrogenation zone.

8. A process for producing a combustible gas consisting essentially of methane and up to 12% by volume of hydrogen gas based upon the combined volume of the methane and the hydrogen gas, said process comprising the steps of:
   (I) contacting in a first hydrogenation zone at temperatures above 550° C.:
      (a) liquid hydrocarbons
      (b) hydrogen gas in an amount greater than that necessary to convert all the hydrocarbons to methane,
      (c) a hydrogenating catalyst selected from the group consisting of molybdenum, tungsten, and chromium to produce an effluent containing methane, higher hydrocarbons and hydrogen by partial hydrogenation of the initial hydrocarbons;

(II) contacting in a second hydrogenation zone at temperatures below 500° C.:

(a) the effluent from the first hydrogenation zone, and (b) oxides of carbon wherein the oxides of carbon and the higher hydrocarbons in the effluent from the first hydrogenation zone are together present in an amount sufficient to reduce the concentration of hydrogen gas in the effluent from the second hydrogenation zone to up to 12 volume percent based on the combined volume of hydrogen gas and methane in the effluent from the second hydrogenation zone.

9. The process of claim 8 wherein the oxides of carbon are primarily carbon dioxide.

10. A continuous process for producing a combustible gas consisting essentially of methane and up to 12% by volume of hydrogen gas based upon the combined volume of the methane and the hydrogen gas, said process comprising simultaneously practicing the steps of:

(I) contacting in a first hydrogenation zone at temperatures above 550° C.:

(a) liquid hydrocarbons, (b) a methane-hydrogen gas mixture, (c) a hydrogenation catalyst selected from the group consisting of molybdenum, tungsten, and chromium, wherein the hydrogen gas is present in an amount greater than that necessary to convert all the hydrocarbons to methane, to produce an effluent containing methane, higher hydrocarbons and hydrogen by partial hydrogenation of the initial hydrocarbons;

(II) contacting in a reforming zone:

(a) hydrocarbons, (b) water, (c) oxygen, to produce an effluent gas consisting essentially of hydrogen, carbon monoxide, carbon dioxide and methane;

(III) contacting in an oxide of carbon sorbing zone:

(a) the effluent gas from the reforming zone, (b) a liquid having a sorptive capacity for the oxides of carbon thereby creating a gaseous effluent and a liquid effluent from said oxide of carbon sorbing zone;

said liquid effluent consisting essentially of the carbon monoxide and the carbon dioxide from the reforming zone effluent and the said liquid;

said gaseous effluent consisting essentially of methane, hydrogen gas and traces of carbon monoxide and carbon dioxide;

(IV) contacting in a methanation zone:

(a) the gaseous effluent of the oxide of carbon sorbing zone, and (b) a methanation catalyst, whereby traces of carbon monoxide and carbon dioxide are converted to methane and water thereby producing an effluent consisting essentially of methane, hydrogen gas, and water;

(V) removing the water from the methanation zone effluent and then employing this effluent as the methane-hydrogen gas mixture in Step I herein;

(VI) contacting in a stripping zone (a) the effluent from the first hydrogenation zone (b) the liquid effluent from the oxide of carbon sorbing zone thereby partially stripping oxides of carbon from said liquid to produce an effluent gas consisting essentially of methane, higher hydrocarbons, hydrogen, carbon monoxide and carbon dioxide;

(VII) contacting in a second hydrogenation zone at temperatures below 500° C.:

(a) the effluent from the stripping zone, (b) a catalyst selected from the group consisting of nickel, ruthenium, cobalt, platinum and palladium whereby the carbon monoxide and the carbon dioxide are converted to methane and water; whereby the higher hydrocarbons are converted to methane; thereby reducing the amount of hydrogen gas in the effluent gas to less than 12 volume percent based on the combined volume of hydrogen gas and methane;

(VIII) removing the water from the effluent of the second hydrogenation step.

11. A continuous process for producing a combustible gas consisting essentially of methane and up to 12% by volume of hydrogen gas based upon the combined volume of the methane and the hydrogen gas, said process comprising simultaneously practicing the steps of:

(I) fractionally distilling liquid hydrocarbons in a fractionation zone to produce a top fraction of $C_5$ and above, a bottom fraction, and a middle fraction constituting about 75% of the charge (II) contacting in a first hydrogenation zone at temperatures above 550° C.:

(a) hydrocarbons from said middle fraction, (b) a methane-hydrogen gas mixture, (c) a hydrogenating catalyst selected from the group consisting of molybdenum, tungsten and chromium, to produce an effluent containing methane, higher hydrocarbons and hydrogen by partial hydrogenation of the hydrocarbons present in the middle fraction of the liquid hydrocarbon, (III) contacting in a reforming zone:

(a) liquid hydrocarbons, (b) water, (c) oxygen, to produce an effluent gas consisting essentially of hydrogen, carbon monoxide, carbon dioxide and methane;

(IV) contacting in an oxide of carbon sorbing zone:

(a) the effluent gas from the reforming zone, (b) a liquid having a sorptive capacity for the oxides of carbon thereby creating a gaseous effluent and a liquid effluent from said oxide-of-carbon sorbing zone;

said liquid effluent consisting essentially of the carbon monoxide and the carbon dioxide from the reforming zone effluent and the said liquid;

said gaseous effluent consistinig essentially of methane, hydrogen gas and traces of carbon monoxide and carbon dioxide;

(V) contacting in a methanation zone:

(a) the gaseous effluent of the oxide of carbon sorbing zone, and (b) a methanation catalyst, whereby traces of carbon monoxide and carbon dioxide are converted to methane and water thereby producing an effluent consisting essentially of methane, hydrogen gas, and water;

(VI) removing the water from the methanation zone effluent and then employing this effluent as the methane-hydrogen gas mixture in Step (I) herein;

(VII) contacting in the first phase of a second hydrogenation zone (a) the effluent from said first hydrogenation zone, (b) the top fraction from said fractionation zone, (c) a catalyst selected from the group consisting of nickel, ruthenium, cobalt, platinum, and palladium whereby the higher hydrocarbons are converted to methane thereby producing an effluent consisting essentially of methane and over 12% by volume of hydrogen gas based on the combined volume of methane and hydrogen gas;

(VIII) contacting in a stripping zone
- (a) the effluent from the first phase of the second hydrogenation zone,
- (b) the liquid effluent from the oxide of carbon sorbing zone thereby partially stripping oxides of carbon from said liquid to produce an effluent gas consisting essentially of methane, hydrogen, carbon monoxide and carbon dioxide;

(IX) contacting in a second phase of the second hydrogenation zone at temperatures below 500° C.
- (a) the effluent from the stripping zone,
- (b) a catalyst selected from the group consisting of nickel, ruthenium, cobalt, platinum, and palladium whereby the carbon monoxide and the carbon dioxide are converted to methane and water; thereby reducing the amount of hydrogen gas in the effluent gas to less than 12 volume percent based on the combined volume of hydrogen gas and methane;

(X) removing the water from the effluent of the second hydrogenation step.

References Cited

UNITED STATES PATENTS

| | | | |
|---|---|---|---|
| 3,019,096 | 1/1962 | Milbourne | 48—213 |
| 3,222,147 | 12/1965 | Benson | 48—197 |
| 3,415,634 | 12/1968 | Dent et al. | 48—213 |
| 3,421,870 | 1/1969 | Sinfelt et al. | 48—213 |
| 3,468,641 | 9/1969 | Gross et al. | 48—213 X |

FOREIGN PATENTS 820,257  9/1959  Great Britain.

JOSEPH SCOVRONEK, Primary Examiner

U.S. Cl. X.R.

48—213; 260—449 M